MAGNETIC MEMORY MEANS AND SYSTEMS

Filed Feb. 13, 1963 7 Sheets-Sheet 1

Inventors
James E. De Witt
Roy Hyink
Richard S. Potter
By Wm. A. Rutio
Attorney

MAGNETIC MEMORY MEANS AND SYSTEMS

June 27, 1967 J. E. DE WITT ETAL 3,328,597

MAGNETIC MEMORY MEANS AND SYSTEMS

Filed Feb. 13, 1963 7 Sheets-Sheet 4

MAGNETIC MEMORY MEANS AND SYSTEMS

Filed Feb. 13, 1963 7 Sheets-Sheet 6

Inventors
James E. De Witt
Roy Hyink
Richard P. Potter
By Wm A. Autio
Attorney

3,328,597
MAGNETIC MEMORY MEANS AND SYSTEMS

James E. De Witt, Waukesha, and Roy Hyink and Richard P. Potter, Wauwatosa, Wis., assignors to Cutler-Hammer, Inc., Milwaukee, Wis., a corporation of Delaware Filed Feb. 13, 1963, Ser. No. 258,185
19 Claims. (Cl. 307—40)

This invention relates to magnetic memory means and systems controlled thereby. More particularly, the invention relates to coded-information storage devices and systems of the magnetic memory type operable in synchronism with a machine or the like to be controlled and wherein coded information may be magnetically recorded or "written" for storage whereafter such information is withdrawn or "read" to control certain functions of the machine.

While not limited thereto, the invention is especially applicable to article conveyor systems for controlling routing of articles such as parcels or packages to selected destinations.

An object of the invention is to provide improved magnetic memory means.

A more specific object of the invention is to provide an improved magnetic memory system having magnetic code devices capable of directly operating switches.

Another specific object of the invention is to provide improved magnetic memory means having movable magnetic code devices capable of directly operating magnetic field responsive switches.

Another specific object of the invention is to provide an improved magnetic memory device capable of cooperation with a plurality of sets of code control apparatus and being common thereto.

Another specific object of the invention is to provide an improved magnetic memory device which is simple in construction and reliable in operation and which is adapted for assembly in different sizes having different capacities for control with a minimum of modification or minimum substitution of parts.

Another specific object of the invention is to provide a magnetic memory device of the type which is driven in synchronism with the machine to be controlled with improved means whereby its code readers can readily be adjusted relative to its code writers and to one another whereby to adapt the same for use with various machines to be controlled thereby.

Another object of the invention is to provide an improved magnetic code controlled sorting conveyor system.

According to the invention, there is provided a magnetic memory device adapted to be driven in synchronism with a machine to be controlled. The latter preferably takes the form of an endless parcel sorting main conveyor arranged in an elongated loop for conveying parcels and selectively depositing them at destinations such as a plurality of transverse take-away conveyors in accordance with codes inserted into the memory device. Such codes are magnetically inserted into the memory device in predetermined positional relation with the parcels on the main conveyor, are stored therein while the parcels are conveyed toward their destinations, and are extracted therefrom to control discharge of the parcels at their destinations. The invention is illustrated as having keys or pushbutton switches and control means which are effective when manually operated to insert codes into the memory device by applying permanent magnetization to discrete bits or magnetizable elements which are driven in synchronism with the main sorting conveyor. When a parcel reaches its preselected destination, the magnetic fields of these elements operate reader devices which then control discharge of the parcel from the main conveyor. These reader devices preferably take the form of magnetically operable reed switches which can be operated directly by the magnetized elements without interposition of complicated and uneconomical amplifiers or the like. As a result, the memory device according to the invention affords a simple and inexpensive system which is reliable in operation and lends itself to numerous applications. The memory device incorporates as a carrier for the magnetic elements an endless chain arranged and driven in an elongated loop. Such chain provides two straight paths of travel for the magnetic elements in opposite directions on opposite sides of the chain loop. Consequently, two sets of code control apparatus, each comprising erasers, coders and readers, can be employed, with the code carrier being common thereto, to increase the capacity of the system. This construction will provide memory devices of different sizes having different capacities for control with a minimum of modification or substitution of parts. Also, the code control apparatus can be readily adjusted whereby to adapt the memory device for control of various conveyor arrangements.

These and other objects and advantages of the invention and the manner of obtaining them will best be understood by reference to the following detailed description of an embodiment thereof taken in conjunction with the accompanying drawings, wherein.

Figure 1:
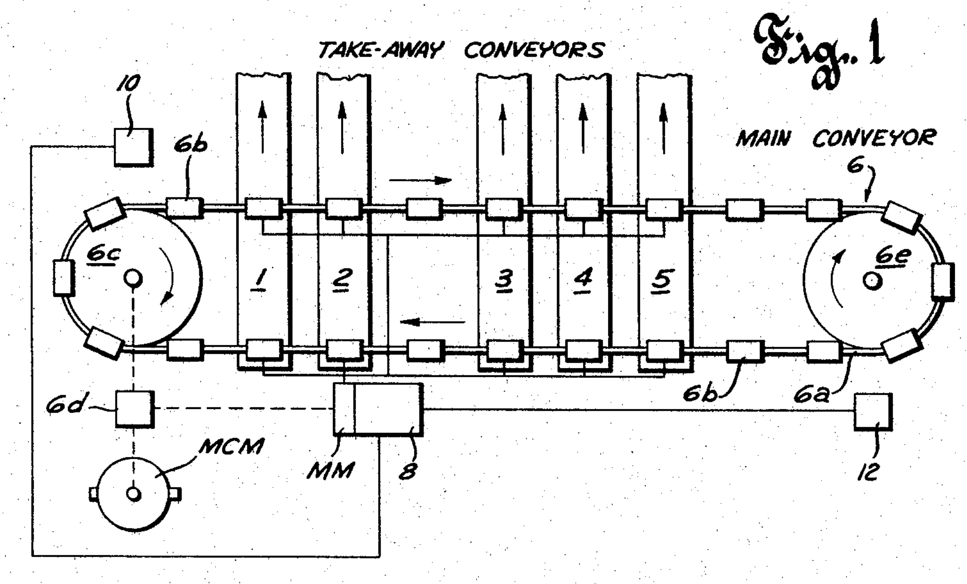
FIG. 1 is a schematic illustration in top view of a conveyor system and control system therefor constructed in accordance with the invention.

Referring to FIG. 1, there is shown a conveyor system to which the invention may be applied. This conveyor system comprises a plurality of delivery or take-away conveyors 1, 2, 3, 4 and 5 and a distributing or main conveyor 6 for conveying articles to the take-away conveyors. While only five take-away conveyors have been shown in FIG. 1, it will be apparent that in actual practice the main conveyor may be longer and that many more take-away conveyors may be provided in view of the large control capacity of the magnetic memory means hereinafter described. Take-away conveyors 1–5 may be of any desired type, such as for example, roller driven belt type for delivering away articles deposited thereon from the main conveyor.

Main conveyor 6 is of the "carrousel" type as shown in FIG. 1. That is, the main conveyor comprises an endless driven member **6*a* arranged in the form of an elongated loop. On this driven member there are mounted a multiplicity of article carriers 6*b*** such as tiltable trays or the like each one of which may be tipped by a solenoid actuator to dump the article or articles being carried thereon onto a selected take-away conveyor. The number of trays provided on the endless driven member is preferably more than twice the number of take-away conveyors to accommodate two sorting operators, one on each side of the main conveyor, as hereinafter more fully described.

As shown in FIG. 1, endless member 6a is provided with suitable driving means. For purposes of illustration, this driving means is shown as comprising a driving sprocket or wheel 6c which is arranged horizontally and is driven on a vertical axis through a reduction gear drive 6d by a main conveyor motor MCM. A similar wheel 6e is arranged at the other end of the loop to serve as an idler to guide the linear sides of the main conveyor loop in their paths of travel. While wheels 6c and 6e have been shown for simplicity of illustration, it will be apparent that other suitable driving means may be employed in place thereof and that the main conveyor could be arranged in other forms.

A control circuit enclosure 8 shown in FIG. 1 is provided near the conveyor system wherein are mounted the control circuit components shown in FIGS. 7*a* through 7*d*. One end of this enclosure houses a magnetic memory device MM which is suitably driven by reduction gearing from the main conveyor drive 6d as depicted by the broken line. The system shown in FIG. 1 is also provided with a pair of sorting operator stations 10 and 12 adjacent opposite ends of the main conveyor, there being one sorting operator station on each side of the main conveyor and being connected to the control circuit in enclosure 8. Each such sorting operator station is provided with a keyboard having a plurality of keys or code buttons thereon whereby codes are inserted into the magnetic memory means, as hereinafter more fully described, in time relationship with loading of articles on the conveyor trays or with passage of articles past the operator's station.

As shown by the lines in FIG. 1, magnetic memory device MM is connected to two sets of tray actuating devices such as solenoids located at the take-away conveyors on opposite linear sides of the main conveyor for control by codes from the respective operator's stations.

Figure 2:
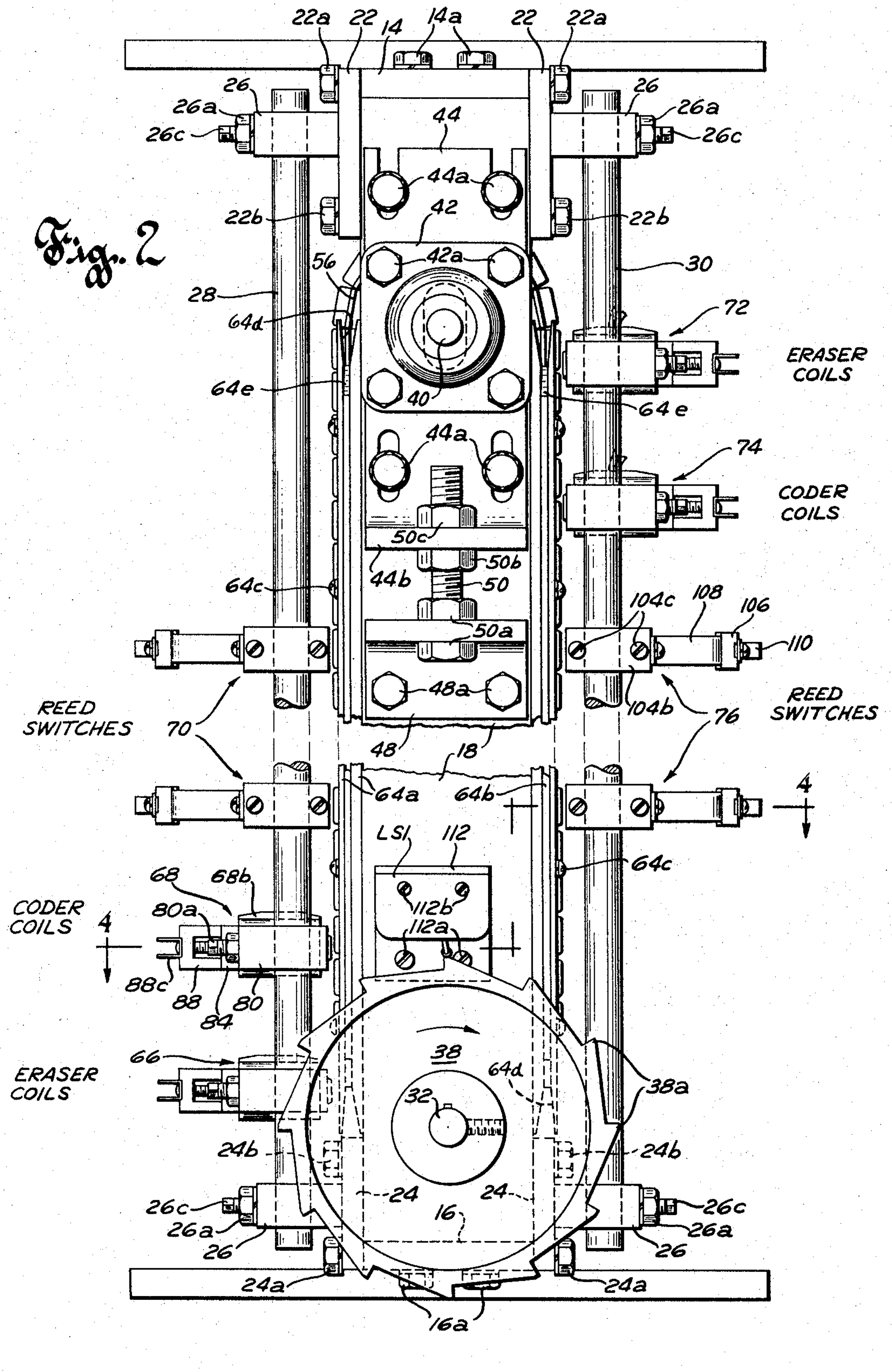
FIG. 2 is a front elevation view of magnetic memory means employed in the control system of FIG. 1.
Figure 3:
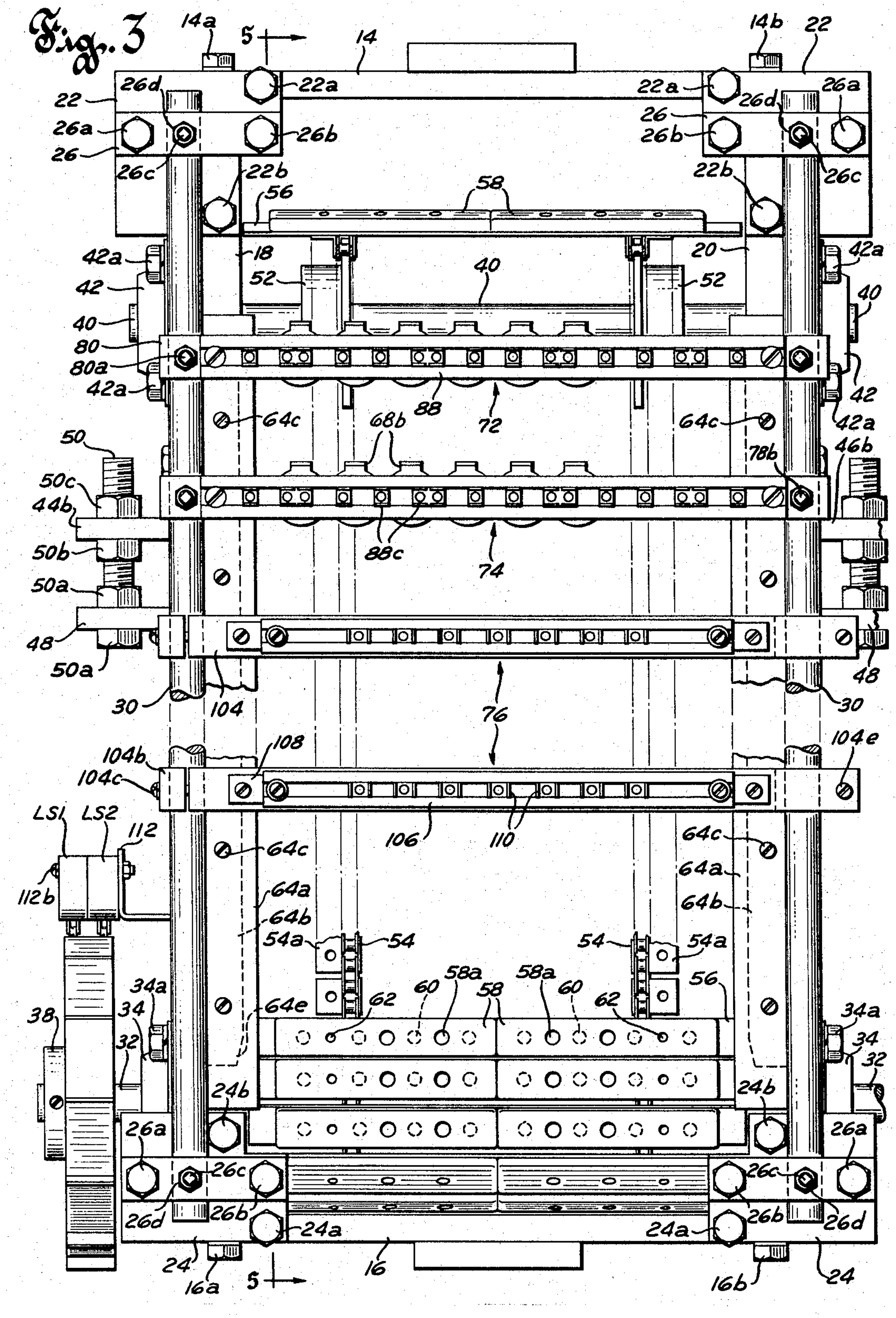
FIG. 3 is a right side elevation view of the magnetic memory means of FIG. 2.

The magnetic memory means shown in FIGS. 2 through 5 is of the chain type, that is, the magnetizable elements are carried on an endless chain which is mechanically driven by the conveyor drive. This magnetic memory device is provided with a generally rectangular frame comprising like upper and lower horizontal frame members 14 and 16 and front and rear vertical frame members 18 and 20. These frame members are rigidly secured to one another at their ends to form a vertically disposed, rectangular frame. For this purpose, pairs of screws 14a and 14b extend downwardly through holes in the opposite ends of upper frame member 14 into threaded engagement in pairs of tapped holes in the upper ends of frame members 18 and 20. Pairs of screws 16a and 16b extend upwardly through holes in the opposite ends of lower frame member 16 into threaded engagement in pairs of tapped holes in the lower ends of frame members 18 and 20 as shown in FIGS. 2 and 3.

Four upper mounting plates 22 are each rigidly secured by a pair of screws 22a and 22b to the sides of the four upper corners of the frame, screws 22a being threaded into upper frame member 14 and screws 22b being threaded into front and rear frame members 18 and 20 as shown in FIGS. 2 and 3. These four upper mounting plates are alike in configuration but the two mounting plates secured to the rear corners of the frame are reversed relative to the two thereof secured to the front corners of the frame as shown in FIG. 3. Four lower mounting plates 24 are each rigidly secured by a pair of screws 24a and 24b to the sides of the four lower corners of the frame, screws 24a being threaded into lower frame member 16 and screws 24b being threaded into front and rear frame members 18 and 20. These four lower mounting plates are alike in configuration but the two rear mounting plates are reversed relative to the two front mounting plates. Also, the four lower mounting plates 24 have a configuration similar to the four upper mounting plates.

Figure 4:
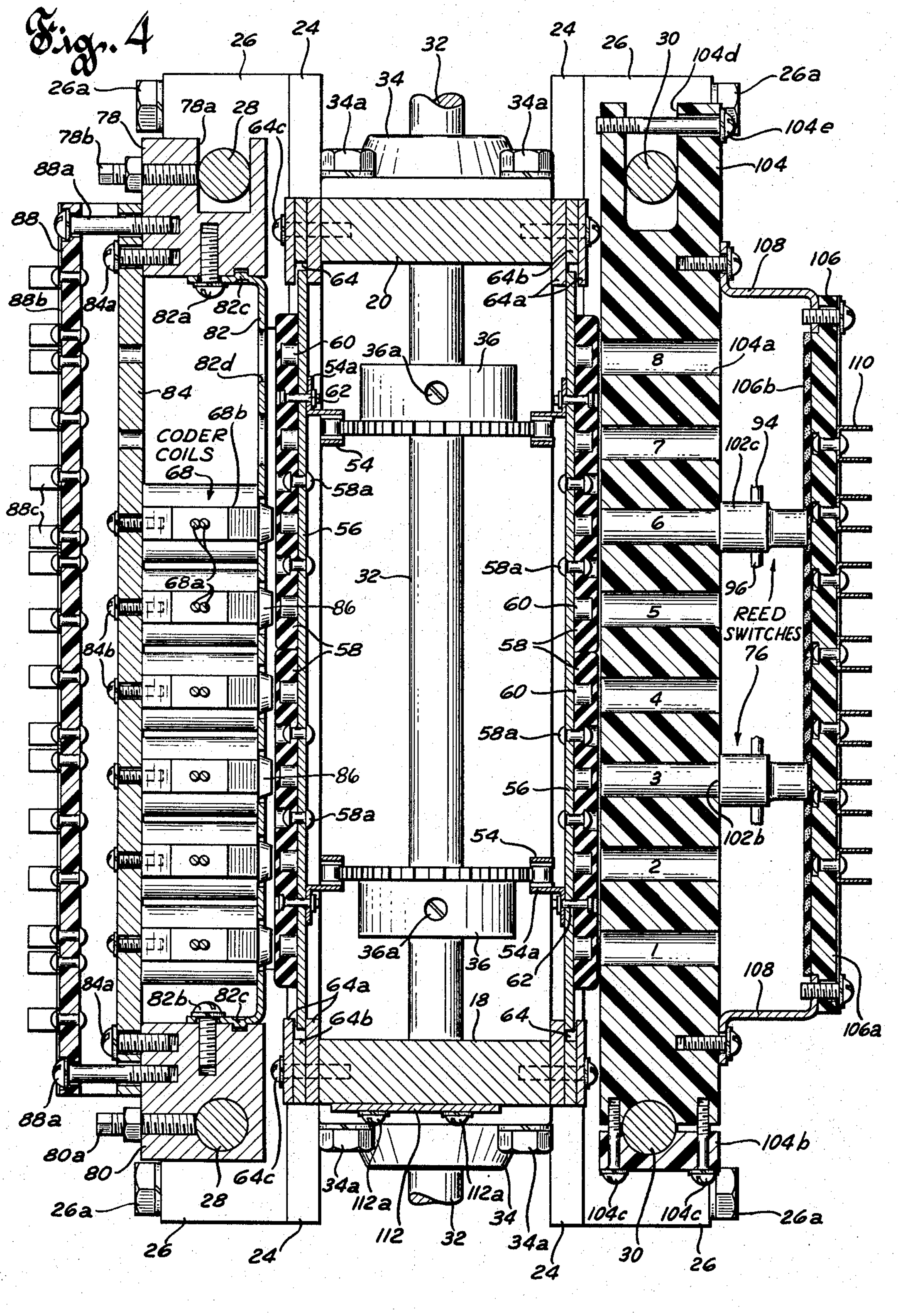
FIG. 4 is a cross sectional view taken along line 4—4 of FIG. 2.

Eight mounting blocks 26 are rigidly secured to the four upper mounting plates 22 and the four lower mounting plates 24. Each such mounting block is secured by a pair of screws 26a and 26b to the associated mounting plate as shown in FIG. 3. These mounting blocks 26 each have a rectangular configuration in top view as can be discerned from FIGS. 2 and 3 and are provided with a vertical hole therethrough for supporting a pair of spaced, vertical supporting rods 28 on the left side of the frame and a like pair of spaced, vertical supporting rods 30 on the right side of the frame as shown in FIGS. 2, 3 and 4. Each mounting block 26 is provided with a set screw 26c threaded transversely into the rod hole to prevent the rod from sliding out. Each such set screw is provided with a locking nut 26d shown in FIG. 3, threaded thereon which is turned in against the mounting block to prevent the set screw from turning after the inner end of the screw has been set against the rod.

A drive shaft 32 extends through alined holes in the lower end portions of front and rear frame members 18 and 20 as shown in FIGS. 3 and 4. This drive shaft is driven from its rear end (right-hand end in FIG. 3) by means hereinbefore described to supply rotary power to the memory device. Suitable bearing cages 34 having ball bearings therein are each secured by four screws 34a as shown in FIGS. 3 and 4 to the front surface of front frame member 18 and to the rear surface of rear frame member 20 whereby to journal the drive shaft in the frame. Two driving sprockets 36 shown in FIG. 4 are mounted in spaced apart relation on shaft 32 between frame members 18 and 20 and are rigidly secured to the drive shaft by set screws 36a or the like. A cam wheel 38 shown in FIGS. 2 and 3 for operating mechanical switches hereinafter described is rigidly secured to the front end of shaft 32 by a set screw, key or the like.

Figure 5:
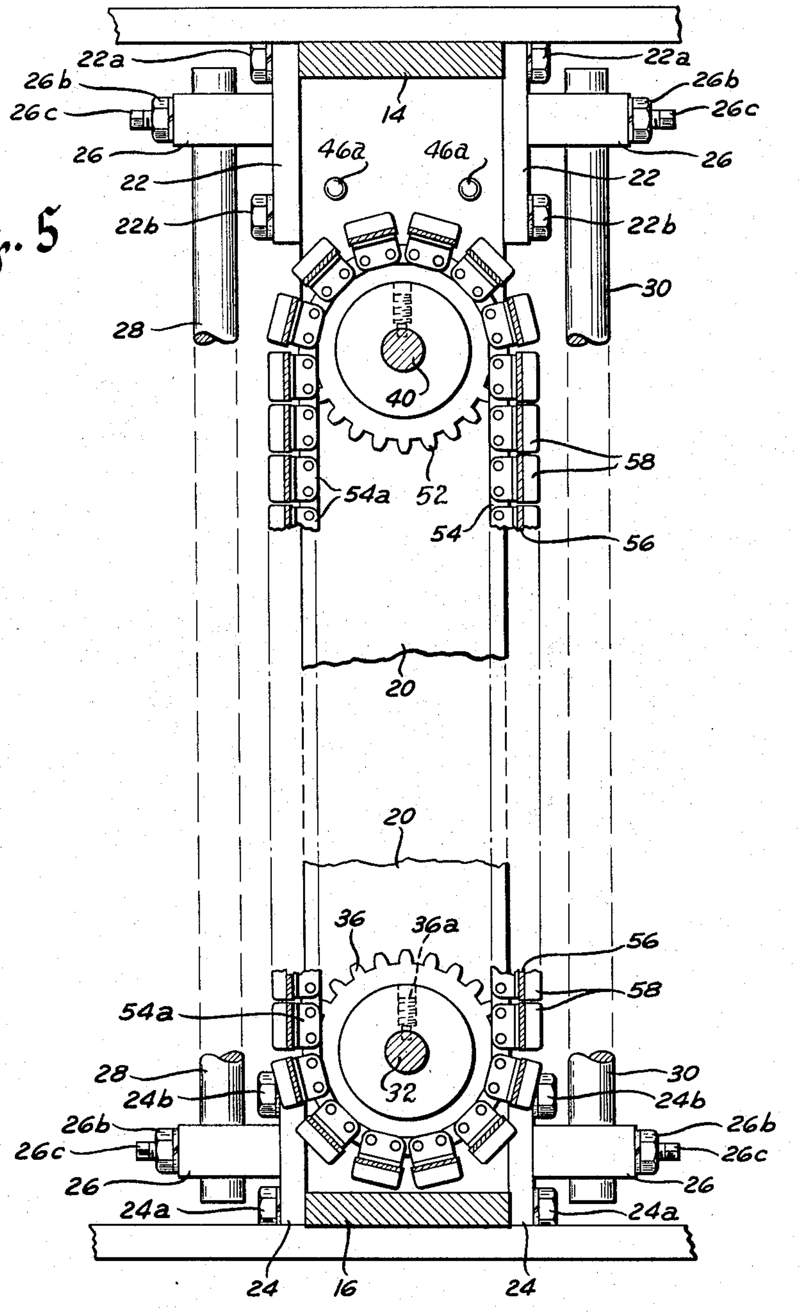
FIG. 5 is a cross sectional view taken along line 5—5 of FIG. 3.

An idler shaft 40 extends through alined apertures in the upper end portions of front and rear frame members 18 and 20 as shown in FIGS. 2, 3 and 5. These alined apertures are vertically elongated as shown in dotted line in FIG. 2 to afford adjustment of the idler shaft vertically to maintain the chains taut as hereinafter described. Suitable bearing cages 42 having ball bearings therein are secured by four screws 42a as shown in FIGS. 2 and 3 to the front surface of a front adjustable mounting plate 44 and to the rear surface of a rear adjustable mounting plate 46 like front plate 44 whereby to journal the idler shaft for rotation. Each plate 44 and 46 is provided with four vertically elongated holes or slots through which screws 44a and 46a extend into threaded engagement in front and rear frame members 18 and 20, respectively, whereby these plates are secured to the frame members.

Means are provided to afford very fine and continuous vertical adjustment of idler shaft bearing mounting plates 44 and 46. These means comprise an angular portion 44b extending forwardly from the lower end of plate 44 and a similar angular portion 46b extending rearwardly from the lower end of plate 46. An angle bracket 48 is rigidly secured by a pair of screws 48a to the front surface of front frame member 18 spaced below angular portion 44b. A threaded shaft 50 extends through a hole in angle bracket 48 and is rigidly secured thereto as by a pair of nuts 50a. Shaft 50 extends through an alined hole in angular portion 44b and is provided with an adjusting nut 50b below and a locking nut 50c above angular portion 44b. It will be apparent that mounting plate 44 can be adjusted by first loosening screws 44a and locking nut 50c and then turning adjusting nut 50b to raise or lower plate 44. When plate 44 is in the desired position, locking nut 50c and screws 44a are retightened. Rear adjustable mounting plate 46 is provided with like adjusting means as shown at the right-hand portion of FIG. 3.

As shown in FIG. 3, two idler sprockets 52 are mounted in spaced apart relation on idler shaft 40 between frame members 18 and 20 and in respective vertical alinement with driving sprockets 36 and are rigidly secured to the idler shaft by set screws or the like. A pair of endless chains 54 are driven by driving sprockets 36, there being one such chain in mesh with each driving sprocket and its associated, vertically alined idler sprocket.

Chains 54 are provided with means for supporting magnetic code elements thereon. As shown in FIGS. 3, 4 and 5, these means comprise angle brackets 54*a* integral with the chains, supporting strips 56 preferably of magnetizable material such as steel and non-magnetic case members 58 preferably of electrical insulating material. Angle brackets 54*a* are mounted on one side of each of chain 54 and constitute alternate connecting links of the chains as shown in FIG. 3. Case members 58 encase magnetizable elements 60. To this end, these case members are in the form of insulating strips or bars and are provided with small cylindrical recesses along one side. These recesses extend almost all the way through the case members so that only a thin portion of insulating material remains between the magnetizable elements 60 and devices which act thereon or respond thereto hereinafter described. After the magnetizable elements are inserted in their recesses, case members 58 are secured by rivets 58*a* to supporting strips 56 whereby the open ends of such recesses are closed as shown in FIG. 4. These subassemblies of supporting strips 56, case members 58 and magnetizable elements 60 are then secured by pins 62 having retaining rings in annular grooves thereon to pairs of angle members 54*a* on the chains, each such subassembly being mounted on two horizontally alined angle members on the two chains.

Means are provided for guiding the magnetic elements for movement in straight vertical paths when the chains are driven so that they will pass in close proximity to writing, reading and erasing devices hereinafter described. These means comprise channels 64 shown in FIG. 4 into which the opposite ends of strips 56 extend and by which such strips are guided for vertical movement and are restricted from lateral movement. Each such channel is formed by a stack of three strips comprising two outer strips 64*a* of equal width and a center strip 64*b* of a narrower width whereby a channel or groove is formed between the outer strips. Four such stacks of strips are provided and are secured by screws 64*c* to the left and right edges of the front and rear frame members 18 and 20 as shown in FIGS. 3 and 4. As shown in FIG. 2, the upper and lower ends of outer strips 64*a* extend beyond the upper and lower ends of center strip 64*b* and are beveled on their inner surfaces to form a diverging slot 64*d* which initially receives the end of strip 56 and guides it into the channel. The end portions of center strip 64*b* are beveled on their inner edges to provide a deeper portion 64*e* for channel 64 at these points as shown in broken lines in FIG. 3 to prevent the strips 56 from catching on the ends of center strips 64*b*.

The aforementioned pair of vertical supporting rods 28 mounted on the left side of the frame are provided for adjustably supporting a first set of code control apparatus comprising a horizontal row of alternating current eraser coils 66, a horizontal row of direct current "writing" or coder coils 68 and a plurality of horizontal rows of "reading" devices or reed switches 70, each such row having a number of reed switches depending upon the code employed, for example, two reed switches when a two-out-of-six code is used. The other pair of vertical supporting rods 30 mounted on the right side of the frame is provided for adjustably supporting a second set of code control apparatus comprising a horizontal row of alternating current eraser coils 72, a horizontal row of direct current "writing" or coder coils 74 and a plurality of horizontal rows of "reading" devices such as reed switches 76. The first set of code control apparatus is provided for one of the sorting operator stations 10 and 12 shown in FIG. 1 and the second set of code control apparatus is provided for the other sorting operator station. In this manner, one sorting operator operates the keyboard thereat and thereby uses one set of code control apparatus to divert parcels onto the take-away conveyors from the upper portion of the main conveyor moving in the right-hand direction in FIG. 1. And the other sorting operator sets the keyboard thereat and thereby uses the other set of code control apparatus to divert parcels onto the take-away conveyors from the lower portion of the main conveyor moving in the left-hand direction in FIG. 1.

Since the means for supporting the eraser coils are like the means for supporting the coder coils with certain differences including the difference that the eraser coils are energized with alternating current whereas the coder coils are energized with direct current, only the means for supporting the coder coils 68 shown in FIGS. 2 and 4 have been shown in detail. The means for supporting the coder coils 68 shown in FIG. 4 comprises a pair of supporting blocks 78 and 80 of brass or the like connected to one another by a non-magnetic bracket 82. The opposite ends of bracket 82 are bent at right angles in the same direction and are rigidly secured by screws 82*a* and 82*b* to the opposed edges of blocks 78 and 80, respectively. As shown in FIG. 4, a short projection 82*c* is punched into each end portion of bracket 82 which fits into a complementary depression in the associated supporting block adjacent the screw hole to prevent the bracket from turning relative to the blocks. Block 80 is provided with a hole through which one of the supporting rods 28 extends so that the row of coder coils can be adjusted to a desired vertical position on the rods. A set screw 80*a* having a locking nut thereon is threaded in block 80 for securing the latter to the associated rod 28. Block 78 is provided with a slot 78*a* opening to the rear edge thereof through which the other supporting rod 28 extends and a set screw 78*b* having a locking nut thereon for rigidly securing the block to the rod. As will be apparent, slot 78*a* facilitates sliding of the coder coil assembly up or down on the rods when the set screws are loosened.

Bracket 82 is preferably made of stainless steel and is secured to the opposite blocks so that the straight midportion thereof is alined with the right-hand edges of such blocks and is in close proximity to case members 58 which enclose the magnetic elements 60. Bracket 82 is provided with a row of spaced holes 82*d* therealong through which extend the ends of magnetic cores hereinafter described.

As shown in FIG. 4, a magnetizable supporting bar 84 is secured at its ends by a pair of screws 84*a* extending therethrough and threaded into the left-hand edges of blocks 78 and 80 to provide space between bar 84 and bracket 82 for a row of coder coils. Bar 84 is provided with a row of spaced holes through which screws 84*b* extend into threaded engagement in the left-hand ends of magnetizable cores 86 to mount the cores on the supporting bar. Coder coils 68 surround the respective cores 86 and are clamped between bar 84 and bracket 82. When the coder coils are so clamped, the right-hand tapered ends of the cores extend through holes 82*d* slightly beyond bracket 82 into very close proximity to the path of travel of case members 58 which carry the magnetic elements 60.

In the means for supporting the eraser coils, the supporting bar corresponding to bar 84 is preferably comprised of non-magnetic brass or the like and a few magnetizable laminations are clamped between such bar and the eraser coils to form a magnetic path between the latter since A.C. is applied to these coils.

A terminal strip 88 is secured at its ends by a pair of screws 88*a* extending therethrough and through the extreme end portions of bar 84 and threaded into blocks 78 and 80 as shown in FIG. 4. As shown in FIG. 2, strip 88 has a U-shaped cross-section and the legs thereof abut bar 84 whereas the channel between such legs provides space for the heads of screws 84*a* and 84*b*. The outer surface of the terminal strip is provided with a shallow groove 88*b* into which are riveted a row of spaced U-shaped terminals 88c, each having two or four connector tongues extending therefrom and being riveted to the terminal strip between such tongues. These terminals are employed to connect the coder coils to external circuits. That is, first connector tongues of the terminals are connected to the coil conductors 68a shown in FIG. 4 and the other connector tongues thereof are connected to other connector tongues and to external circuits hereinafter described in connection with FIGS. 7*a–d*. Coils 68 are preferably encased in molded material which provides an external ridge 68b along one side having tapered end portions and providing support for the two coil conductors 68a emerging from the midportion of such ridge.

Since reed switches 70 and their mounting structures shown in FIG. 2 are similar to reed switches 76 and their mounting structures, only the latter will be described in detail.

Figure 6:
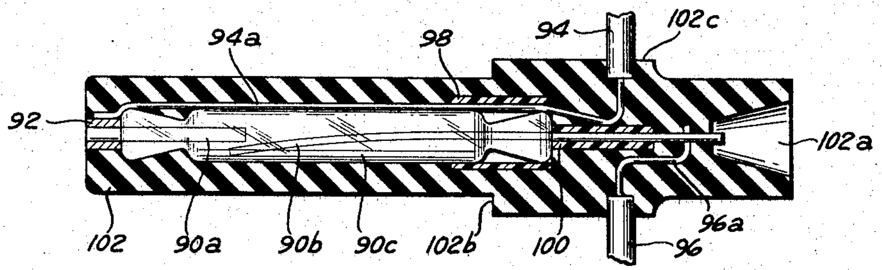
FIG. 6 is a cross sectional view of a magnetic field responsive reed switch employed in the magnetic memory means.

Referring to FIG. 6, there is shown an enclosed reed switch having a stationary contact 90a and a movable contact 90b enclosed and hermetically sealed in an elongated tubular envelope 90c. The envelope is preferably comprised of transparent material such as glass and the opposite ends thereof are sealed around the stationary and movable contacts to support the latter so that the inner ends of the contacts overlap and are spaced from one another providing a normally open switch. The contacts extend through the opposite ends of the envelope to provide external terminals. In reed switches of this type, the movable contact is longer than and extends a greater distance within the envelope than the stationary contact to provide resiliency so that a magnetic field can move the same into engagement with the stationary contact.

The reed switch is provided with means for sensitizing the same to enable operation of the contacts by small magnetic elements passing by one end of the switch. This means comprises a short tubular slug 92 comprised of electrically conducting and magnetizable material such as steel for concentrating the operating magnetic field in the switch terminal and contact. As the stationary contact is shorter and thicker than the movable contact, the stationary contact end is selected for use as the sensing end of the switch. As shown in FIG. 6, slug 92 is slid onto and around the external terminal of stationary contact 99a close to or against the end of the glass envelope and is rigidly secured thereto as by frictional engagement or tack welding to hold the parts together. The frictional fit of the slug on the terminal forms an electrical and magnetic connection therebetween.

The reed switch is provided with short electrical conductors to enable connection thereof through a terminal strip to an external electrical circuit. These conductors include a first conductor 94 connected to stationary contact 90a and a second conductor 96 connected to movable contact 90b. As shown in FIG. 6, conductor 94 is provided with a bare wire portion 94a the end portion of which is electrically connected as by soldering or welding to the outer surface of slug 92 and therethrough and through the terminal to the stationary contact so that the end of the bare wire does not extend beyond the forward end of the slug. The bare wire portion extends along the exterior of envelope 90c to a point adjacent the terminal of the movable contact and at this point is bent to extend radially from the switch. The remainder of conductor 94 is insulated and the other end is provided with an electrical connector such as a receptacle for receiving a tongue connector as shown in Roy Hyink and R. P. Potter copending application Ser. No. 258,235, filed Feb. 13, 1963, now Patent No. 3,249,714, dated May 3, 1966. An insulating sleeve 98 is slid over envelope 90c and bare conductor 94a to the rear end of the envelope to hold the bare conductor to the envelope. Another insulating sleeve 100 is slide over the terminal of movable contact 90b up to envelope 90c to insulate bare conductor 94a therefrom. Conductor 96 is provided with a short bare wire portion 96a the end of which engages the terminal of the movable contact at a point rearwardly of sleeve 100 and is electrically connected thereto as by soldering. Bare wire portion 96a is bent forwardly to partially overlap the rear end of sleeve 100 and is then bent outwardly or radially to extend in a direction opposite to that of the insulated portion of conductor 94. The remainder of conductor 96 is insulated and the other end is provided with an electrical connector such as a receptacle for receiving a connector tongue.

The subassembly hereinbefore described is provided with a molded case 102 for strengthening the same and to form a probe-like switch. That is, plastic electrically insulating material is cast or molded around this subassembly completely to enclose the same except that the forward ends of slug 92 and the terminal of the stationary contact are left exposed. Although the extreme rear tip of the movable contact terminal is shown exposed in FIG. 6 at the bottom of a frusto-conical depression 102a in the rear end of the molded case, that is not required for functional purposes but instead results from the molding process. This tip is gripped in the mold and the subassembly is held thereby and centered when the molding material is applied. The forward end of molded case 102 is provided with a reduced diameter, cylindrical shape to a point near the rear end of envelope 90c where such reduced portion ends in a shoulder 102b. Rearwardly of this shoulder, the molded case is provided with a larger diameter, cylindrical shaped portion 102c to provide support for conductors 94 and 96. As shown in FIG. 6, the insulated portions of the conductors are partially embedded in such enlarged portion of the molded case. The extreme rear end portion of the molded case is preferably also of reduced diameter.

FIG. 4 shows mounting and connecting means for a plurality of switches. This mounting means comprises an elongated block 104 of electrically insulating material, a clamping member 106 and a pair of substantially Z-shaped brackets 108 for securing the clamping member to the block. The aforementioned connecting means comprises a plurality of electrical connector terminals 110 secured to clamping member 106 which together may constitute a terminal strip.

Block 104 is provided with a plurality of round holes 104a therethrough for receiving a plurality of switches so that shoulder 102b bears against the right-hand edge surface of the block. The ends of the block are provided with suitable securing structures adapting the block for mounting and adjustment on the pair of spaced vertical rods 30.

Clamping member 106 may take the form of a terminal strip comprising a bar 106a of insulating material having a hole at each end for securing the same to first ends of brackets 108 by screws or the like whereas the other ends of the brackets are secured to the right-hand edge surface of block 104 by screws to clamp the switches in their holes 104a. Between the end screws, bar 106a has secured thereto a series of terminals 110 by rivets or the like. Each terminal 110 is illustrated as having a U-shape providing two or four connector tongues and having a hole in the yoke portion between the tongues whereby the terminal is riveted to strip 106a. Connector receptacles of the switches may be placed on first tongues of a pair of terminals and the other tongues thereof may be connected to an external circuit. A strip 106b of resilient material such as rubber is secured as by cementing to the left-hand surface of strip 106a shown in FIG. 4 to bear against the rear ends of the switches to avoid the requirement for close dimensional tolerances in these parts.

When a magnetized element 60 is moved past the forward sensing end of the switch, the magnetic field emanating from such element is concentrated or drawn by slug 92 into the end of the switch. That is, use of slug 92 provides a low reluctance path of larger cross-sectional area for the magnetic flux whereby the latter is concentrated in the end of the switch. As a result, the stationary contact becomes magnetized and attracts the movable contact thereto to close the contacts. Use of slug 92 reduces the magnetic field strength required to be emitted by element 60 for reliable operation of the switch. When element 60 is moved away from the sensing end of the switch, the magnetism retained in the stationary contact is insufficient to overcome the mechanical spring bias of the movable contact and the movable contact separates from the stationary contact.

To enable mounting of block 104 on rods 30, the front end thereof is provided with an arcuate recess shown in FIG. 4 for receiving a portion of rod 30. A clamping member **104*b* having a similar recess is secured by a pair of screws 104*c* to the end of block 104 to clamp rod 30** therebetween.

The rear end of block 104 is provided with an elongated slot **104*d* to provide a forked end to the block. Rod 30 is received in this slot. A screw 104*e* extends through a hole in the extreme end of the block at one side of the slot and is threaded into the end of the block at the other side of such slot. Tightening of screw 104*e* biases the divided portions of the block toward one another to grip rod 30 therebetween. It will be apparent that when screws 104*c* and 104*e* are loosened, block 104 can easily be slid up or down on rods 30**. In this manner the reed switches can be accurately adjusted to a desired vertical position.

As shown in FIGS. 2 and 3, a pair of limit switches LS1 and LS2 are mounted by a Z-bracket 112 to front frame member 18 above cam wheel 38 for operation by the latter. Bracket 112 is secured by a pair of screws **112*a* to frame member 18 and the limit switches are secured in abutting relation by a pair of bolts 112*b* to the projecting end of the bracket. Two such limit switches are provided, one for each set of code control apparatus, to control energization of the coder coils at the precise moment when a row of magnetizable elements is passing thereby. Cam wheel 38 is shown as being provided with twelve cams 38*a*. The arrangement is such that successive cams 38*a*** operate the limit switches (limit switch LS1 also being shown in FIG. 7*a*) when successive rows of magnetizable elements are passing by the coder coils.

As shown in FIG. 2, drive shaft 32 is driven in the clockwise direction. This causes the horizontal rows of magnetizable elements to be carried downwardly on the right-hand side of the magnetic memory device and to be carried upwardly on the left-hand side thereof. Considering the code control apparatus on the right-hand side, these rows of elements first pass by eraser coils 72 whereby the alternating magnetic fields remove the magnetism therefrom. The rows of elements then pass by coder coils 74 whereby selected elements in each row are magnetized by direct current magnetic fields in coded combinations. The rows of elements then pass by a plurality of rows of reed switches 76 successively. The first row of reed switches is spaced from the coder coils in proportion to the spacing of operator's station 10 in FIG. 1 from take-away conveyor 1 and in proportion to the relative speeds of the magnetic memory device and the main conveyor. The successive rows of reed switches are spaced from one another in proportion to the spacing of the successive take-away conveyors from one another and in proportion to the relative speeds of the magnetic memory device and the main conveyor. The arrangement is such that successive trays **6*b* on the main conveyor in FIG. 1 correspond to successive horizontal rows of magnetic elements on the magnetic memory device and to cams on wheel 38. There is a row of reed switches for each take-away conveyor and a distinctive code for each take-away conveyor. The arrangement is such that when a tray carrying a parcel reaches a take-away conveyor, for example, take-away conveyor 1, a row of magnetic elements carrying a code also reaches the row of reed switches corresponding to take-away conveyor 1. In this manner, if the tray carries a parcel and a magnetic code indicative of take-away conveyor 1 is present, such code will be read and apparatus will respond to deposit the parcel from the tray onto take-away conveyor 1**.

The code control apparatus on the other side of the magnetic memory device is similarly arranged with respect to sorting operator's station 12 and the take-away conveyors in reverse order 5 to 1 of the latter as will be apparent in FIG. 1.

It will be apparent from the foregoing description, that the magnetic memory device can readily be constructed or modified to incorporate a greater number or any desired number of code carriers and code readers. This can be accomplished by substituting longer front and rear frame members 18 and 20, a longer endless chain comprising parts 54 and 56, and longer supporting rods 28 and 30 and chain guides 64. With such modification, the supporting rods will accommodate more rows of reed switches. Since the rows of magnetic elements 60 are carried on a chain, such chain can be readily modified by addition of links and code element supporting strips. Since only a very few parts need be substituted or modified, the invention facilitates the provision of magnetic memory devices of many different sizes and capacities.

Figures 7A, 7B:
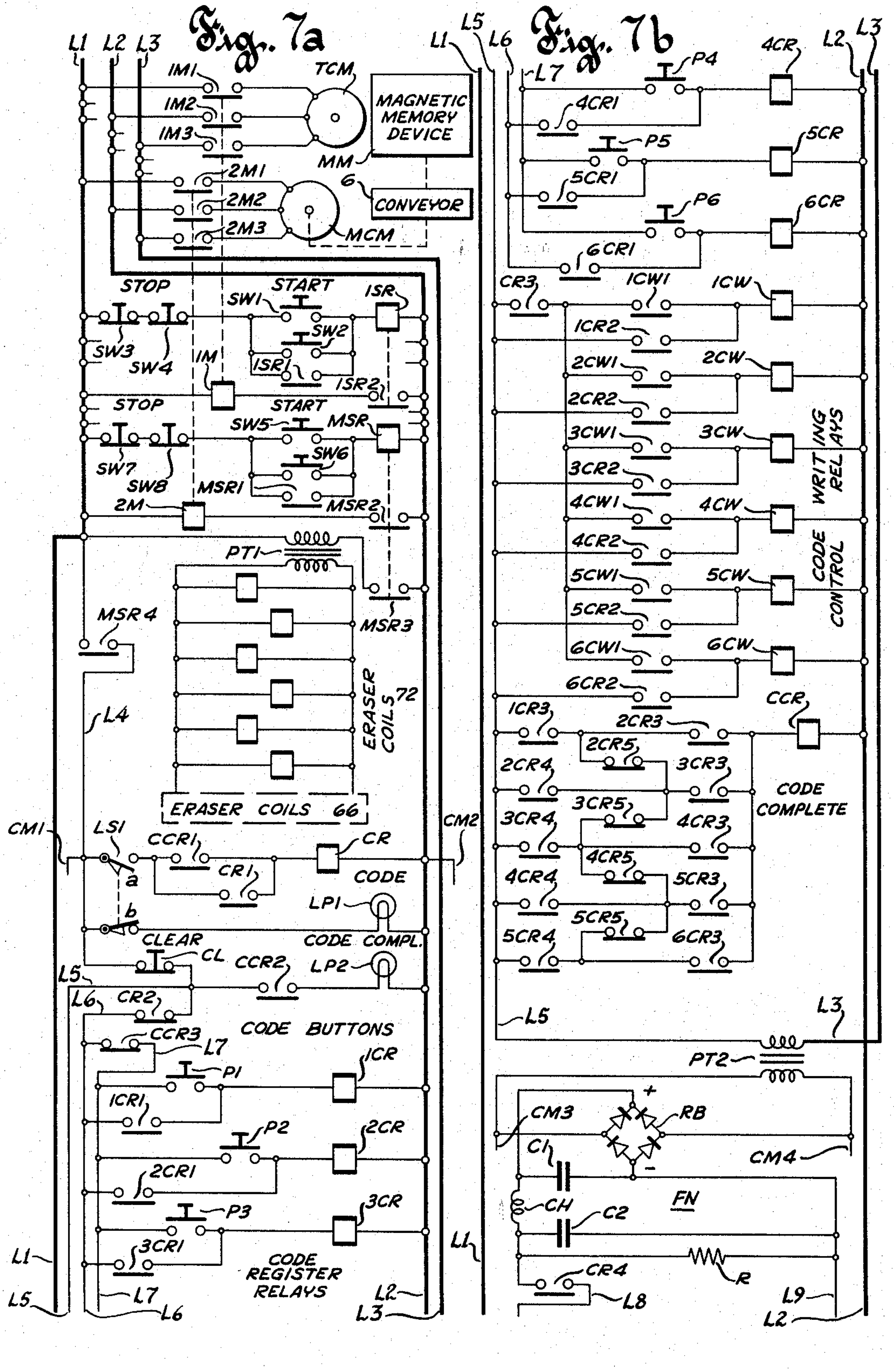
FIGS. 7*a* through 7*d* diagrammatically illustrate an electromagnetic control system for the conveyor system of FIG. 1 and the magnetic memory means of FIGS. 2 through 6.
Figure 7C:
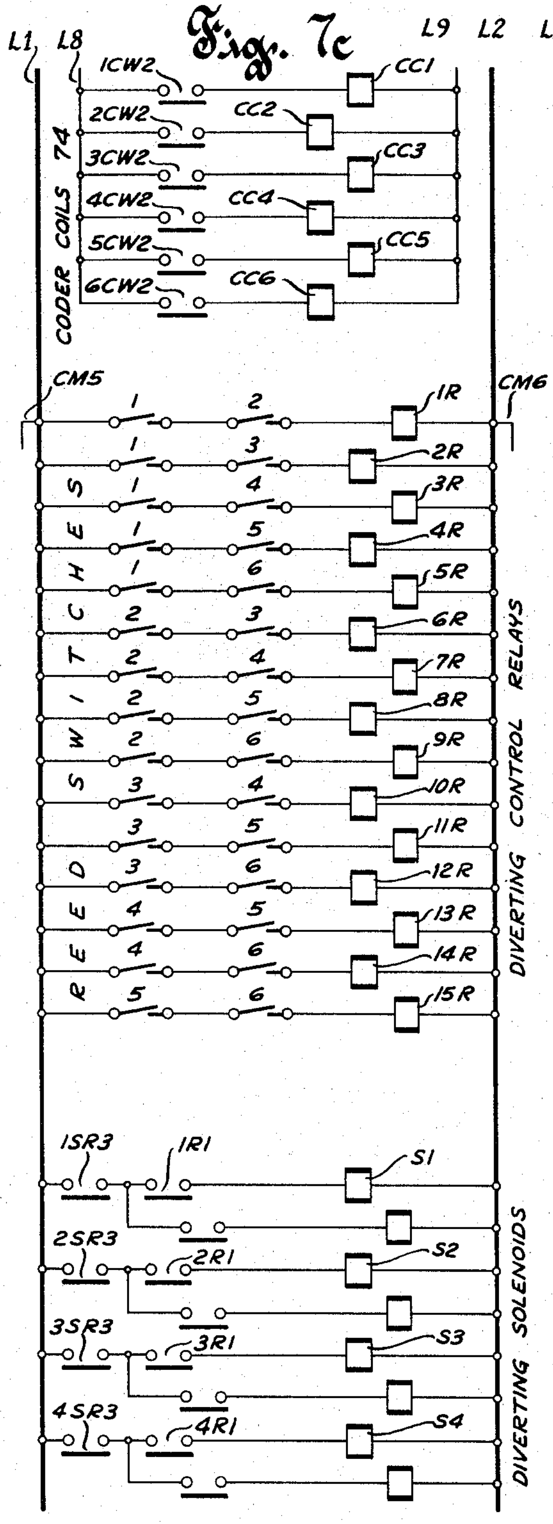

FIGS. 7*a*–7*d* show a circuit diagram of a control system whereby the magnetic memory device of FIGS. 2–6 is employed to control the conveyor system of FIG. 1. As aforementioned, the magnetic memory device is common to both sorting operators stations 10 and 12. That is, the operator at station 10 uses the code control apparatus mounted on one side of the memory device and the operator at station 12 uses the code control apparatus mounted on the other side of the memory device and both operators use the chain-carried magnetic elements in common. Since the portion of the system for controlling sorting from station 12 is like the portion of the system for controlling sorting from station 10, only the latter has been illustrated in detail and the former has been illustrated partially to show how it is connected to the latter and to the power supply and motors common thereto. Suitable conductor multiples left disconnected are shown in FIGS. 7*a*–7*c* to indicate how those circuits not illustrated are connected. It will be apparent as the description proceeds that both portions of the control system are operated in like manner. In FIGS. 7*a*–7*d*, the circuit in each preceding figure connects at its lower portion to the upper portion of the circuit in each succeeding figure.

Referring to FIG. 7*a*, there is shown a main conveyor motor MCM arranged to drive main conveyor 6 and magnetic memory device MM at different speeds as depicted by the broken lines. The take-away conveyor motors are illustrated collectively as a single motor TCM, it being understood that in actual practice each take-away conveyor 1–5 shown in FIG. 1 and additional ones thereof would be provided with an individual motor like motor TCM and starting control circuit therefor hereinafter described. These motors are shown as being of the three-phase alternating current, induction type. A three-phase alternating current power supply source may be connected to power supply lines L1, L2 and L3 through a suitable three-pole disconnect switch to supply power to the motors and to the control circuits.

The motor control circuit for take-away conveyor motor TCM in the upper portion of FIG. 7*a* is provided with a motor energizing contactor 1M and a starting control relay 1SR for the latter. Two start switches SW1 and SW2 for the respective sorting stations 10 and 12 are connected in parallel and two stop switches SW3 and SW4 for the respective sorting stations are connected in series in the circuit of the operating coil of relay 1SR to afford starting and stopping of the take-away conveyors from each sorting station. Relay 1SR is provided with a self-maintaining contact 1SR1 in shunt of the start switches and a contact 1SR2 for controlling contactor 1M. The latter is provided with contacts 1M1, 1M2 and 1M3 for connecting lines L1, L2 and L3 to motor TCM.

The motor control circuit for main conveyor motor MCM is provided with a motor energizing contactor 2M and a starting control relay MSR for the latter. Two start switches SW5 and SW6 for the respective sorting stations 10 and 12 are connected in parallel and two stop switches SW7 and SW8 are connected in series in the circuit of the operating coil of relay MSR to afford starting and stopping of the main conveyor from each sorting station. Relay MSR is provided with a self-maintaining contact MSR1 in shunt of the start switches and a contact MSR2 for controlling contactor 2M. The latter is provided with contacts 2M1, 2M2 and 2M3 for connecting lines L1, L2 and L3 to motor MCM. Relay MSR is also provided with a contact MSR3 for connecting lines L1 and L2 to a transformer PT1 whereby to supply power to the two sets of eraser coils 66 and 72 mounted on opposite sides of the magnetic memory device as shown in FIGS. 2 and 7*a*. Relay MSR is further provided with a contact MSR4 for connecting line L1 through a conductor L4 to a coding control circuit hereinafter described.

As shown in FIG. 7*a*, eraser coils 72 are connected in parallel across the secondary winding of transformer PT1. The other set of eraser coils 66 are similarly connected and are shown schematically as a broken line rectangle to avoid complicating the drawing.

In the lower portion of FIG. 7*a*, there is shown a code control relay CR having its operating coil connected through a contact *a* of a synchronizing limit switch LS1 and a contact CCR1 of a code complete relay between conductor L4 and line L2. Relay CR is provided with a self-maintaining contact CR1 in shunt of contact CCR1. A "clear" switch CL connects conductor L4 to conductor L5 and may be manually opened to restore code control relays hereinafter described. Relay CR is provided with a contact CR2 connecting conductor L5 to conductor L6, a contact CR3 in FIG. 7*b* for connecting conductor L5 to a plurality of code writing control relays hereinafter described and a contact CR4 for allowing energization of coder coils 74 at the proper time. A contact CCR1 of code complete relay CCR connects conductor L6 to conductor L7. Contact *b* of limit switch LS1 connects a code lamp LP1 between conductor L4 and line L2 to indicate that the system is ready for coding. A contact CCR2 of relay CCR when closed connects a code complete lamp LP2 between conductor L5 and line L2 to indicate that code registering has been completed.

A plurality of code register relays 1CR through 6CR shown in the lower portion of FIG. 7*a* and the upper portion of FIG. 7*b* are provided for registering a code until it is transferred to the magnetic elements of the memory device, there being one such relay for each coder coil 74 shown in FIG. 3. A plurality of code buttons P1 through P6 of the manual pushbutton switch type are provided for energizing the respective code register relays from conductor L7 to line L2. Relays 1CR through 6CR are provided with respective self-maintaining contacts 1CR1 through 6CR1 connected between their operating coils and conductor L6 to maintain energization thereof independently of code buttons P1 through P6.

In FIG. 7*b*, there is shown a plurality of code writing control relays 1CW through 6CW, there being one such relay for each code register relay. Relays 1CW through 6CW are energizable through respective contacts 1CR2 through 6CR2 of the code register relays from conductor L5 to line L2. Relays 1CW through 6CW are provided with respective self-maintaining contacts 1CW1 through 6CW1 all of which contacts are connectable through contact CR3 of code control relay CR to conductor L5.

The operating coil of code complete relay CCR is connectable from conductor L5 to line L2 by any two of the code register relays 1CR through 6CR so that relay CCR will be energized whenever a code is registered by energizing two of the code register relays. For this purpose, parallel connected normally open contact pairs 1CR3 and 2CR3, 2CR4 and 3CR3, 3CR4 and 4CR3, 4CR4 and 5CR3, and 5CR4 and 6CR3 form five parallel circuits for relay CCR, the contacts of each such pair thereof being in series connection. Also the junctions of the contacts in succeeding parallel branches are connected by normally closed contacts 2CR5, 3CR5, 4CR5 and 5CR5 so that any pair of code register relays will energize relay CCR but a single code register relay cannot energize relay CCR. As will be apparent, this connection arrangement provides the system with a two-out-of-six code. This circuit arrangement can readily be enlarged in a similar manner to accommodate a larger number of code register relays if desired.

In the lower portion of FIG. 7*b*, transformer PT2 connects power from conductor L5 and line L3 through a full-wave rectifier bridge RB and a filter network FN comprising a choke coil CH and a pair of capacitors C1 and C2 and then through a normally open contact CR4 of relay CR for supplying unidirectional power across conductors L8 and L9 which extend to the circuits of coder coils 74 in FIG. 7*c*. A resistor R is connected across filter network FN as a load resistor when contact CR4 is open. Coder coils 74 individually identified as coils CC1 through CC6 are energizable with rectified current across conductors L8 and L9 through respective contacts 1CW2 through 6CW2 of the code writing control relays.

Figure 7D:
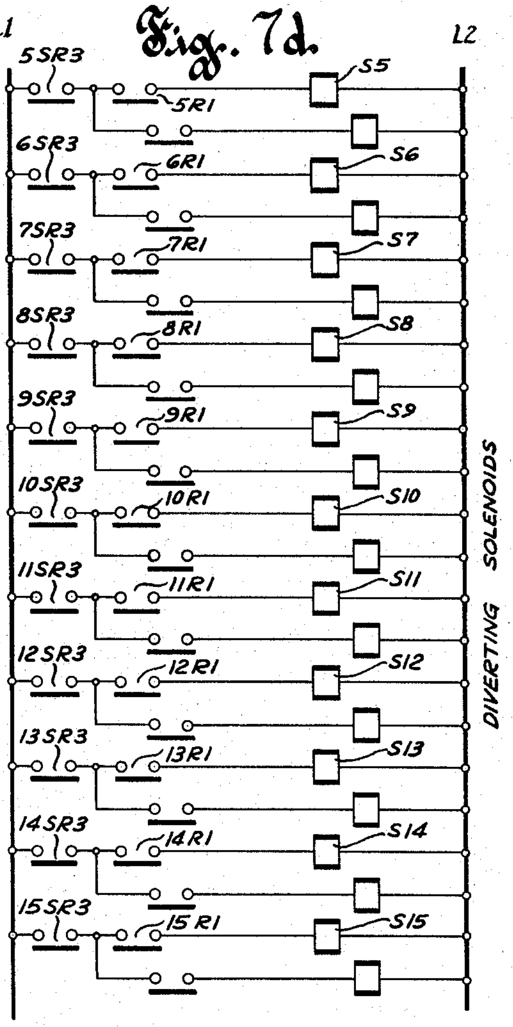

The remainder of the circuit in FIG. 7*c* and FIG. 7*d* comprises the apparatus for reading the codes from the magnetic elements and for controlling dumping of articles from the main conveyor onto the take-away conveyors. As shown in FIGS. 3 and 4, pairs of reed switches 76 are mounted on a plurality of horizontally arranged supports 104 which are supported on the vertical rods 30. For purposes of reference, these reed switch positions may be consecutively numbered from 1 through 8 as shown in FIG. 4. When a two-out-of-six code is used as hereinbefore assumed for purposes of description, only two reed switches need be mounted on each horizontal support so that each pair of reed switches will respond only to the code corresponding to the associated take-away conveyor. As will be apparent, the pairs of reed switches are spaced vertically from one another in FIG. 4 in proportion to the spacing of the take-away conveyors from one another in FIG. 1 so that a pair of reed switches will be operated when the article reaches its destination take-away conveyor. In FIG. 4, reed switches are shown in positions 3 and 6. In FIG. 7*c*, the reed switches are similarly numbered. It will, therefore, be apparent that the pair of reed switches shown in FIG. 4 correspond to diverting control relay 12R. If desired, a reed switch may be mounted in each hole 1 to 8 in each support 104 in FIG. 4 so that any two thereof can be connected to the associated solenoid. With this arrangement, the code for the corresponding take-away conveyor can readily be altered by merely changing the solenoid connections on terminals 110.

As shown in FIG. 7*c*, there are provided a group of fifteen diverting control relays 1R through 15R, corresponding to the maximum number of different codes obtainable and take-away conveyors usable with the use of six vertical columns of magnetic elements and a two-out-of-six code. Each of these diverting control relays is connected through a different pair of reed switches in series across lines L1 and L2.

In the lower portion of FIG. 7*c* and FIG. 7*d*, there are shown a group of fifteen diverting solenoids S1 through S15 controllable from sorting station 10, there being one such solenoid for each take-away conveyor for actuating main conveyor trays or the like to dump articles on the take-away conveyors. Each of these solenoids is energized across lines L1 and L2 by closure of two contacts in series. The first contacts 1SR3 through 15SR3 are closed by relay 1SR in FIG. 7*a* and corresponding relays in the other take-away conveyor motor starting control circuits, respectively, so that articles can be deposited from the main conveyor onto the take-away conveyors only if the latter are running. The second contacts 1R1 through 15R1 are closed by relays 1R through 15R when codes are read by the reed switches.

The second set of solenoids in the lower portion of FIG. 7*c* and FIG. 7*d* and contacts in series therewith are controlled from the other operator's station 12. These solenoids and series contacts are connected respectively in parallel with solenoids S1 through S15 and contacts 1R1 through 15R1 and include contacts 1SR3 through 15SR3 in their respective circuits so that the take-away conveyors must be running in order to dump articles on the latter in accordance with codes registered from station 12.

As shown in FIG. 7*a*, conductor multiples CM1 and CM2 connect to a second circuit like that shown below these multiples at the lower portion of FIG. 7*a* and in the upper and midportions of FIG. 7*b* for control from operator's station 12. As shown at the lower portion of FIG. 7*b*, conductor multiples CM3 and CM4 connect to a second circuit like that shown below the transformer at the lower portion of FIG. 7*b* and at the upper portion of FIG. 7*c*. And as shown in FIG. 7*c*, conductor multiples CM5 and CM6 connect to a second similar set of diverting control relays and a second similar set of pairs of reed switches for control from operator's station 12.

The operation of the system shown in FIGS. 7*a–d* will now be described. Pushbutton switch SW1 is pressed to energize the operating coil of relay 1SR through stop switches SW3 and SW4. Relay 1SR closes contact 1SR1 to maintain its operating coil energized in shunt of start switch SW1 whereafter the latter may be released to allow it to reopen. Contact 1SR2 closes to energize the operating coil of contactor 1M. Contactor 1M closes its contacts 1M1, 1M2 and 1M3 to energize motor TCM whereby to start take-away conveyor 1 in FIG. 1 running. Relay 1SR also closes contact 1SR3 in FIG. 7*c* which completes a point in the circuit of tray actuating solenoid S1. The other take-away conveyors are provided with similar motors and starting circuits and are started running in a similar manner. As a result, the relays of these other starting circuits corresponding to relay 1SR close contacts 2SR3, 3SR3, etc. in FIGS. 7*c* and 7*d*. Solenoids S1 through S15 in FIGS. 7*c* and 7*d* correspond to take-away conveyors 1 through 15, respectively, and can be energized only if the respective take-away conveyors are running. In this manner, the tray-actuating-solenoid energizing circuits are interlocked with the take-away conveyor starting circuits so that a tray cannot be tipped to deposit a parcel on a particular take-away conveyor unless such take-away conveyor is running. While only five take-away conveyors have been shown in FIG. 1, it will be apparent that solenoids S6 through S15 correspond to additional take-away conveyors. With the use of six code coils and a two-out-of-six code, parcels can be sorted to a total of fifteen take-away conveyors corresponding to solenoids S1 through S15 from one sorting operator's station. The other set of fifteen solenoids shown in FIGS. 7*c* and 7*d* is for actuating trays on the other side of the main conveyor under the control of the other sorting operator's station as aforementioned.

While apparatus utilizing a two-out-of-six code and being capable of controlling sorting to fifteen take-away conveyors has been described, it will be apparent that the system can readily be modified to accommodate other codes. The maximum number of take-away conveyors to which articles can be sorted depends upon the number of vertical columns of magnetizable elements used and the type of code employed. The maximum number of combinations of N magnetizable elements taken P at a time is equal to N factorial divided by the product of P factorial and $(N-P)$ factorial. For a two-out-of-six code, 720 is divided by the product of 2 and 24 which results in 15 as the maximum number of code combinations. A three-out-of-six code provides 20 different codes whereby to control sorting to twenty take-away conveyors. In a similar manner, a four-out-of-eight code provides 70 different code combinations whereby articles can be sorted to seventy take-away conveyors.

Referring to FIG. 7*a*, it will be apparent that each take-away conveyor starting circuit is provided with another starting switch SW2 connected in parallel with switch SW1 to enable starting of the take-away conveyors from the other sorting operator's station. Also, each such starting circuit is provided with another stop switch SW4 in series with stop switch SW3 to enable stopping of the take-away conveyors from the other sorting operator's station.

To start the main conveyor running and to prepare the system for coding, start switch SW5 is momentarily pressed. This causes energization of the operating coil of relay MSR through stop switches SW7 and SW8. Contact MSR1 closes to maintain energization of its operating coil in shunt of switch SW5 whereafter the latter may be released to allow it to reopen. Contact MSR2 closes to energize the operating coil of contactor 2M. Contactor 2M closes contacts 2M1, 2M2 and 2M3 to energize motor MCM and to start main conveyor 6 and magnetic memory device MM running. Relay MSR closes contact MSR3 to connect power through transformer PT1 for energization of eraser coils 72 and also eraser coils 66 on the other side of the memory device. These eraser coils remain energized whenever the magnetic memory device is running so that any magnetism on the magnetizable elements will be removed by the alternating current fields of the eraser coils as such elements pass thereby toward the coder coils as shown in FIG. 2. Relay MSR closes contact MSR4 in FIG. 7*a* to apply power to conductor L4 and from the latter through switch CL to conductor L5. This power is also applied from conductor L5 through contact CR2 to conductor L6 and from the latter through contact CCR3 to conductor L7. Lamp LP1 ignites through contact *b* of limit switch LS1 to indicate that the system is ready for coding.

To register a code, let it be assumed that code buttons P1 and P3 are pressed. This code corresponds to take away conveyor 2. The code buttons are preferably pressed at the time an article is passing by the operator's station. The articles may be fed into the trays either electromechanically under automatic control by sensing the approach of trays or they may be placed in the trays manually by a loading operator ahead of the sorting operator's station. Such closure of switches P1 and P3 causes energization of code register relays 1CR and 3CR at the lower portion of FIG. 7*a*. Contacts 1CR1 and 3CR1 close to maintain relays 1CR and 3CR operated in shunt of switches P1 and P3 and contact CCR2 whereafter the code buttons may be released to allow them to reopen. Contacts 1CR2 and 3CR2 in FIG. 7*b* close to energize code writing control relays 1CW and 3CW. Contacts 1CR3 and 3CR3 in FIG. 7*b* close to complete an energizing circuit from conductor L5 therethrough and through normally closed contact 2CR5 and the operating coil of relay CCR to line L2. Contact 3CR4 closes without effect, this contact becoming effective when another code combination including code button P3 is applied. Contact 3CR5 opens to prevent energization of relay CCR by code button P3 and relay 3CR alone. Relay CCR closes contact CCR2 in FIG. 7*a* to ignite lamp LP2 to indicate that coding has been completed, that is, that the code has been stored. Contact CCR3 opens to prevent further coding from code buttons P1 through P6.

The aforementioned energization of relays 1CW and 3CW causes closure of contacts 1CW1 and 3CW1 to close points in respective maintaining circuits for these relays. Contacts 1CW2 and 3CW2 in FIG. 7*c* close points in the direct current energizing circuits of coder coils CC1 and CC3. However, these coder coils are held unenergized by contact CR4 at the lower portion of FIG. 7*b* until the magnetizable elements corresponding to the tray on which an article was placed approach the row of coder coils.

As the magnetic memory device is driven further in the direction shown by the arrow in FIG. 2 so that the horizontal row of magnetizable elements corresponding to the tray carrying the article reach the coder coils, cam wheel 38 in FIG. 2 actuates limit switch LS1 to close contact *a* and to open contact *b* thereof. In FIG. 7*a*, contact *b* extinguishes lamp LP1 and contact *a* energizes relay CR through contact CCR1. Relay CR closes contact CR1 to maintain itself energized in shunt of contact CCR1. Contact CR3 in FIG. 7*b* closes to maintain relays 1CW and 3CW energized through their respective contacts 1CW1 and 3CW1 in shunt of contacts 1CR2 and 3CR2, respectively. Contact CR4 at the lower portion of FIG. 7*b* closes to energize coder coils CC1 and CC3. As a result, these coder coils magnetize the first and third magnetizable elements in the horizontal row. Contact CR2 in FIG. 7*a* opens to disconnect power from conductors L6 and L7 thereby to restore code register relays 1CR and 3CR. Relays 1CR and 3CR reopen their self-maintaining contacts 1CR1 and 3CR1. Contacts 1CR2 and 3CR2 reopen without effect as relays 1CW and 3CW are maintained energized. Contacts 1CR3, 3CR3, 3CR4, and 3CR5 restore to deenergize relay CCR. The latter restores contacts CCR1, CCR2 and CCR3 to open the relay CR energizing circuit, to extinguish lamp LP2 and to close a point in the circuits of the code register relays.

When the cam on wheel 38 disengages limit switch LS1, the later restores to the position shown in FIG. 7*a* to deenergize relay CR and to light lamp LP1. Relay CR opens its self-maintaining contacts CR1, closes contact CR2 to again render code buttons P1 through P6 effective for additional code registering, opens contact CR3 to deenergize relays 1CW and 3CW and opens contact CR4 to deenergize coder coils CC1 and CC3. Relays 1CW and 3CW open their maintaining contacts 1CW1 and 3CW1 and open their contacts 1CW2 and 3CW2 in the circuits of coder coils CC1 and CC3.

The code is now carried by the magnetized elements and this code will be read to deposit the article on the take-away conveyor corresponding to code 1–3, that is, take-away conveyor 2. When the magnetized elements pass the reader corresponding to take-away conveyor 1, only read switch No. 1 will be closed so that relay 1R in FIG. 7*c* will not energize. When the magnetized elements reach the reader corresponding to take-away conveyor 2, reed switches 1 and 3 in this reader will close to energize relay 2R. At this time the article has reached take-away conveyor 2. As a result, contact 2R1 energizes solenoid S2 to actuate the tray and thereby to deposit the article on the second take-away conveyor.

In a similar manner, each time after limit switch LS1 restores and relay CR recloses its contact CR2, any pair of code buttons P1 through P6 may be pressed to register another code while the previously-coded articles are traveling along the main conveyor. Lamp LP1 indicates when the code buttons may be pressed.

While the apparatus hereinbefore described is effectively adapted to fulfill the objects stated, it is to be understood that we do not intend to confine our invention to the particular preferred embodiment of magnetic memory means and systems disclosed, inasmuch as it is susceptible of various modifications without departing from the scope of the appended claims.

We claim:

1. A magnetic memory system comprising a plurality of input signal circuits;

means operable for selectively and successively energizing said input signal circuits in different code combinations;

a plurality of output control circuits;

and a magnetic memory device adapted to receive and store informational codes and adapted to be driven in synchronism with a machine to be controlled by said output control circuits in accordance with such codes and comprising an endless movable carrier means and means for moving the same;

a multiplicity of groups of magnetizable elements mounted on said endless movable carrier means having a plurality of such elements in each group and each element in each group being spaced from the others whereby corresponding elements in said groups travel in respective parallel planes when said carrier means is moved;

a plurality of magnetizing devices controllable by the input signal circuits and being fixedly mounted with respect to corresponding magnetizable elements in said groups whereby corresponding magnetizable elements in said groups pass in close proximity to respective ones of said magnetizing devices when said carrier means is moved, and said magnetizing devices being effective to magnetize a coded combination of said elements in a different group in accordance with each operation of said energizing means;

means synchronized with movement of said carrier means to cause energization of said magnetizing devices at times when said groups of magnetizable elements are passing thereby;

a multiplicity of coded groups of magnetic responsive devices mounted in spaced apart relation in the direction of said carrier means so that said groups of elements sucessively come into proximity thereto when said carrier means moves, each said group of magnetic responsive devices having at least a number of devices equal to the number of elements magnetized for a code combination, and means responsive to said coded groups of magnetic responsive devices for operating corresponding output control circuits.

2. The invention defined in claim 1, wherein said endless movable carrier means comprises:

an endless chain arranged in an elongated loop;

and means for driving said chain so that opposite elongated sides thereof move in opposite directions in linear paths.

3. The invention defined in claim 1, wherein said means for energizing said input signal circuits comprises:

a plurality of manually operable switches corresponding in number to the number of said magnetizing devices.

4. The invention defined in claim 3, wherein said plurality of input signal circuits comprises:

electroresponsive means operable by said manually operable switches to register a code;

and means synchronized with the movement of said carrier means for energizing said magnetizing devices in accordance with the registered code when a group of said elements comes into magnetic proximity to said magnetizing devices.

5. The invention defined in claim 4, together with:

means responsive to complete registration of a code on said electroresponsive means for rendering said manually operable switches ineffective so that a second code cannot be registered until the first code has been utilized.

6. The invention defined in claim 4, together with:

an indicator for indicating that the system is ready for registration of a code;

and means synchronized with the movement of said carrier means for operating said indicator.

7. The invention defined in claim 5, together with:

an indicator indicating that a code has been completely registered;

and means responsive to complete registration of a code for operating said indicator.

8. The invention defined in claim 5, wherein said means synchronized with the movement of said carrier means comprises:

means effective following energization of said magnetizing devices in accordance with the registered code when said group of elements leaves the proximity of the latter for restoring said electroresponsive code registering means whereby the system becomes ready for registration of another code.

9. The invention defined in claim 7, together with:
a "clear" switch effective when operated to restore said electroresponsive code registering means and said indicator operating means whereby to render said manually operable switches effective for registering another code.

10. The invention defined in claim 1, wherein said groups of magnetic responsive devices comprise:
a plurality of groups of magnetic responsive reed switches, each said group having a number of reed switches equal to the number of elements magnetized for a single code, and the reed switches in the respective groups being fixed in coded positions with respect to the magnetizable elements in the groups thereof.

11. The invention defined in claim 1, wherein said groups of magnetic responsive devices comprise:
a plurality of groups of magnetic responsive reed switches;
and said output control circuits being connected to different combinations of reed switches in the respective groups thereof.

12. A magnetic memory device controllable to store codes thereon and being automatically responsive at a later time to extract said codes therefrom for operation of utilization devices in accordance with said codes comprising:
a pair of endless chains arranged in elongated loops;
means mounting said chains in parallel planes and driving said chains in unison so that opposite sides thereof move in opposite directions;
a multiplicity of groups of small magnetizable elements;
means mounting the magnetizable elements of said groups across said chains to provide spaced parallel rows of said magnetizable elements therealong;
and two sets of magnetic control means, one of said sets of magnetic control means being mounted adjacent each side of said pair of chains so that said rows of magnetizable elements pass in close magnetic field proximity thereto when said chains are driven, and each set of magnetic control means comprising:
a plurality of direct current magnetizing coils;
means operable to energize selected magnetizing coils in a coded combination when magnetizable elements of said rows pass thereby to magnetize selected elements thereof in a like coded combination;
a plurality of rows of magnetic field responsive encapsulated reed switches mounted in spaced apart relation at fixed points transversely of and in close proximity to a portion of said chains for operation by the magnetic fields of magnetized elements passing thereby;
and a row of alternating current coils mounted ahead of said magnetizing coils for removing magnetic codes from said rows of elements before they approach the magnetizing coils.

13. The invention defined in claim 12, wherein each set of magnetic control means also comprises:
adjustable mounting means for said rows of reed switches comprising;
a pair of parallel elongated members mounted on opposite sides of said pair of chains in a plane adjacent thereto;
and transverse supporting means for each row of reed switches slideably mounted on said elongated members to afford adjustment thereof relative to the other rows of reed switches and relative to said magnetizing coils.

14. The invention defined in claim 12, wherein said means mounting and driving said chains comprises:
a drive shaft having a pair of sprockets secured thereto for driving said chains at one end of the loops thereof;
an idler shaft having a corresponding pair of sprockets secured thereto for guiding said chains at the other end of the loops thereof;
means comprising a frame having bearings mounted thereon rotatably supporting said drive and idler shafts;
and means mounted on said frame for affording fine relative adjustment of the bearings of said shafts to tighten said chains.

15. The invention defined in claim 12, wherein said means operable to energize selected magnetizing coils comprises:
manually operable means for selectively transmitting codes;
electroresponsive means for registering each transmitted code and for storing the same while certain magnetizable elements approach said magnetizing coils;
and means synchronized with the movement of said chains for energizing said magnetizing coils in accordance with the registered code when said certain magnetizing elements pass said magnetizing coils.

16. The invention defined in claim 15, wherein said synchronized means comprises:
a cam wheel secured to said drive shaft, said cam wheel having cams on the periphery thereof angularly spaced in proportion to the spacing of said rows of magnetizable elements on said chains;
a limit switch mounted on said frame for actuation by said cams;
and means responsive to actuation of said switch when a row of magnetizable elements is passing said magnetizing coils for causing energization of the latter in accordance with the registered code.

17. The invention defined in claim 16, wherein said cam wheel is common to the limit switches of both sets of magnetic control means.

18. The invention defined in claim 14, together with:
means mounted on opposite sides of said frame for guiding the means on which said groups of magnetizable elements are mounted so that the latter travel in linear paths in close proximity to the two sets of magnetic control means.

19. In a magnetic memory device for receiving codes electrically transmitted thereto under operator control and for magnetically storing such codes and for thereafter reading such codes whereby to operate electroresponsive load devices whenever a code upon being read corresponds to a code to which a coded electroresponsive device will respond, in combination:
an endless carrier chain;
means for driving said chain in synchronism with an external device to be controlled;
a plurality of elongated supporting members mounted on and across said chain in parallel relation to one another and spaced apart along said chain, the spacing between adjacent ones of said supporting members being a function of corresponding operations of the external device to be performed,
a plurality of groups of normally unmagnetized but magnetizable elements mounted on the respective supporting members, each said group comprising a plurality of such magnetizable elements mounted on and in spaced apart relation to one another along the associated supporting member,
a plurality of magnetizing devices mounted at a fixed point in a row transversely of said chain in registration with and immediately adjacent to the respective magnetizable elements of said groups so that corresponding magnetizable elements of said groups pass closely by said magnetizing devices when said chain is driven, means for electrically energizing said magnetizing devices in selected and coded combinations at times when said groups of magnetizable elements are passing by the same thereby to magnetize selected elements of selected groups thereof and to store input codes on the selected groups of elements, a plurality of rows of magnetically-responsive reader devices mounted at fixed points transversely of said chain in spaced apart and parallel relation to one another in the direction of and immediately adjacent said chain so that said magnetizable elements of said groups pass by said rows of reader devices and operate the latter in accordance with the magnetic codes stored thereon, and a plurality of load devices connected to said rows of reader devices, respectively, and each said load device comprising means responsive to the associated row of reader devices when the latter reads a code designated for said load device and different from the other codes for causing the corresponding load device to perform an operation on the external device to be controlled.

References Cited

UNITED STATES PATENTS

| | | | |
|---|---|---|---|
| 1,868,894 | 7/1932 | Glahn. | |
| 2,427,057 | 9/1949 | Knox. | |
| 2,923,420 | 2/1960 | Dyer. | |
| 3,011,621 | 12/1961 | Byrnes | 214—11 X |
| 3,033,366 | 5/1962 | Atanasoff | 209—82 |
| 3,034,634 | 5/1962 | Brand | 214—11 X |
| 3,075,653 | 1/1963 | Wales | 214—11 |
| 3,086,636 | 4/1963 | Raynor | 198—26 |
| 3,100,040 | 8/1963 | Kleist. | |
| 3,157,270 | 11/1964 | Prucha | 198—38 |
| 3,158,710 | 11/1964 | Paglee | 198—38 |
| 3,173,533 | 3/1965 | Zuch | 198—38 |
| 3,173,557 | 3/1965 | Eliassen | 214—11 X |
| 3,200,933 | 7/1965 | Schenk | 198—38 |

ORIS L. RADER, *Primary Examiner.*

T. J. MADDEN, *Assistant Examiner.*